United States Patent [19]
Ceglio et al.

[11] Patent Number: 5,257,132
[45] Date of Patent: * Oct. 26, 1993

[54] BROADBAND DIFFRACTIVE LENS OR IMAGING ELEMENT

[75] Inventors: Natale M. Ceglio, Livermore; Andrew M. Hawryluk, Modesto; Richard A. London, Oakland; Lynn G. Seppala, Livermore, all of Calif.

[73] Assignee: The United States of America as represented by the United States Department of Energy, Washington, D.C.

[*] Notice: The portion of the term of this patent subsequent to Dec. 10, 2008 has been disclaimed.

[21] Appl. No.: 683,592

[22] Filed: Apr. 9, 1991

Related U.S. Application Data

[63] Continuation-in-part of Ser. No. 587,699, Sep. 25, 1990, Pat. No. 5,071,207.

[51] Int. Cl.$^5$ .............................................. G02B 5/18
[52] U.S. Cl. ..................... 359/565; 359/576; 359/589
[58] Field of Search ............... 359/565, 568, 571, 576, 359/581, 589, 887

[56] References Cited

U.S. PATENT DOCUMENTS

| | | | |
|---|---|---|---|
| 3,871,769 | 3/1975 | Engel et al. | 359/565 |
| 3,874,782 | 4/1975 | Schmidt | 385/8 |
| 3,877,797 | 9/1975 | Thornton, Jr. | 359/887 |
| 3,944,320 | 3/1976 | McLintic | 359/884 |
| 3,990,775 | 11/1976 | Kaminow et al. | 385/40 |
| 4,379,233 | 4/1983 | Rosenthal | 250/223 R |
| 4,453,224 | 6/1984 | Crooks, Jr. | 359/565 |
| 4,877,298 | 10/1989 | Teng et al. | 385/2 |
| 4,915,463 | 4/1990 | Barbee, Jr. | 359/568 |
| 5,130,857 | 7/1992 | Cupta et al. | 359/900 |

Primary Examiner—Bruce Y. Arnold
Assistant Examiner—J. P. Ryan
Attorney, Agent, or Firm—Henry P. Sartorio; Roger S. Gaither; William R. Moser

[57] ABSTRACT

A broadband diffractive lens or imaging element produces a sharp focus and/or a high resolution image with broad bandwidth illuminating radiation. The diffractive lens is sectored or segmented into regions, each of which focuses or images a distinct narrowband of radiation but all of which have a common focal length. Alternatively, a serial stack of minus filters, each with a diffraction pattern which focuses or images a distinct narrowband of radiation but all of which have a common focal length, is used. The two approaches can be combined. Multifocal broadband diffractive elements can also be formed. Thin film embodiments are described.

43 Claims, 11 Drawing Sheets

TRANSMITTED COLORS

DOUBLE SIDED MULTILAYER DEPOSITION

SINGLE SIDED MULTILAYER DEPOSITION

BROADBAND DIFFRACTIVE LENS OR IMAGING ELEMENT

The United States Government has rights in this invention pursuant to Contract No. W-7405-ENG-48 between the U.S. Department of Energy and the University of California, for the operation of Lawrence Livermore National Laboratory.

This application is a continuation-in-part of Ser. No. 07/587,699, filed Sep. 25, 1990 now U.S. Pat. No. 5,071,207 issued Dec. 10, 1991.

BACKGROUND OF THE INVENTION

This invention relates generally to diffractive imaging elements or lenses, including Fresnel zone plates, Fresnel phase plates, blazed Fresnel phase plates or other patterns which focus radiation primarily by diffraction, and more particularly to diffractive imaging elements having significantly reduced chromatic aberrations to produce a sharp focus and/or produce high quality images using much broader bandwidth radiation than is possible with conventional diffractive lenses.

Fresnel zone plates, Fresnel phase plates, and blazed Fresnel phase plates can be used to focus and/or image radiation. Blazed Fresnel phase plates are described in N. M. Ceglio and H. I. Smith, in "Proceedings VIII Int'l Conf. on X-Ray Optics and Microanalysis" (D. R. Beaman R. E. Ogilvie, and D. B. Wittry, Eds.), P. 255, Pendell, Midland, Mi., 1980. In addition, other diffractive optical elements (e.g., holograms or holographic optical components) can also be used to focus or image radiation. All these optical elements use primarily diffraction to achieve focus or image formation. Since diffractive power (e.g., focal length) is strongly wavelength dependent, all of these diffractive lens structures suffer from chromatic aberrations.

Fresnel diffractive structures (e.g., Fresnel zone plates, Fresnel phase plates, and blazed Fresnel phase plates) are divided into Fresnel zones where the radius of the nth zone is given by $$r_n^2 = nr_1^2 + n^2\lambda^2/4 \qquad (1)$$

where $r_1$ is the radius of the central zone and $\lambda$ is the wavelength of the radiation to be focused. Such a Fresnel zone structure may be viewed as a diffractive lens having a focal length, $$f = r_1^2/\lambda \qquad (2)$$

The focal length of the lens is wavelength dependent; indeed, the geometrical pattern itself (i.e., placement of the $r_n$'s) is wavelength dependent. If a Fresnel structure designed to focus radiation at one wavelength, $\lambda_1$, is used with radiation at a different wavelength, $\lambda_2$, there will be a focal error or chromatic aberration (from equation (2)). The conventionally "acceptable" bandwidth for such a lens is generally taken as $$\Delta\lambda = 1/N \qquad (3)$$

where N = total number of zones. Under the conditions of equation (3), the performance of the lens is virtually diffraction limited and the focal spot size approaches the width of the outermost zone, $$\Delta r = r_N - r_{N-1} \qquad (4)$$

In practice, the acceptable bandwidth for illumination of the Fresnel structure will depend on the application, and will be determined by a trade-off between efficiency (i.e., accepting a broader bandwidth) and resolution loss (primarily due to chromatic aberrations).

Thus, diffractive lenses generally produce a sharp focus or a high resolution image only if illuminated with sufficiently narrowband ($\Delta\lambda = \lambda/N$) radiation. For these reasons, conventional diffractive imaging systems or lenses are generally viewed as narrowband imaging systems or imaging systems suffering from severe chromatic aberrations.

In many regions of the electromagnetic spectrum (and for other radiation such as neutrons, atoms, ions), refractive lenses are not practical so that diffractive lenses are all that are available to focus or image the radiation. This results either from severe absorption of the radiation in materials and/or because the refractive power of available materials is not sufficiently different from vacuum for those types of radiation. Under such circumstances, there is a great motivation for a scheme which would enable diffractive lenses to focus and/or image broadband radiation. Indeed, most sources of electromagnetic radiation in these spectral regions are broadband, for example, synchrotrons, plasmas, blackbody radiation, etc. Diffractive lenses also have properties which would make them very useful for application in parts of the electromagnetic spectrum where refractive optics already exist. For example, diffractive lenses have been easily implemented as bifocal and/or multifocal imaging and focusing elements. (Indeed, a bifocal or multifocal diffractive lens may simply be considered a hologram.) In addition, diffractive lenses can have high dioptric power and at the same time be very thin and easily deformable, making diffractive lenses attractive options for intraocular lenses and/or contact lenses. U.S. patent application Ser. No. 495,073 filed Mar. 19, 1990 (now abandoned) describes microthin diffractive lenses for intraocular implants and corneal lenses. In these applications, it would be highly beneficial, and perhaps essential, that the diffractive lenses be able to focus and image broadband radiation and have significantly reduced chromatic aberrations.

There is, in addition, a great interest in x-ray optics in having relatively broadband imaging and focusing optics which can approach diffraction limited resolution. At soft x-ray wavelengths, Fresnel structures (zone plates and phase plates) have demonstrated diffraction limited resolution down to about 300A with narrowband ($\Delta\lambda < \lambda/N$) illumination. The best performance for broadband imaging has been achieved using grazing incidence reflection optics, and image resolutions of order $\geq 1$ $\mu$m have been demonstrated. There are applications in x-ray microscopy, materials analysis, and x-ray matter interaction studies which could benefit from an ability to focus and/or image relatively broadband radiation with diffraction limited or near diffraction limited performance.

With such a strong motivation for broadband diffractive optics, there have been various attempts to design diffractive lens doublets or triplets to correct for and/or reduce the chromatic aberrations in diffractive optics. These approaches to chromatic aberration correction are less than satisfactory for at least two reasons: (1) They generally involve two or more diffractive elements separated by a finite distance. As such, they are really a "lens system" or an "optical system", not a simple, compact broadband lens. For many applications (e.g., contact lens or intraocular lens implants), the "system" approach is not practical. (2) In addition, diffractive optical elements typically operate at limited efficiency. For example, an ideal Fresnel zone plate diffracts only 10% of the incident (narrowband) radiation into its first order focus, and an ideal Fresnel phase plate (in the absence of radiation absorption) diffracts 40% of the incident narrowband radiation into its first order focus. [However, if the Fresnel phase structure is appropriately blazed a blazed Fresnel phase plate) it can. in principle. direct 100% of the incident radiation into its focal spot.] Thus, an optical system for chromatic aberration correction that puts M such structures (each having efficiency $\lambda$) in series suffers in overall radiation transport efficiency by a factor of $(\lambda)^M$. For example, a triplet (M=3) of zone plate structures ($\lambda=0.1$) would have an overall efficiency of 0.001.

SUMMARY OF THE INVENTION

The invention is a Broadband Diffractive Lens (BBDL), which is produced by at least one of two approaches.

In one embodiment, the diffractive lens is divided into lisegments or sectors", each having its own, individualized, narrowband ($\Delta\lambda$ where $\lambda$=wavelength of the radiation) filter which ideally would pass the radiation within bandwidth $\Delta\lambda$, and reject (i.e., not pass; e.g., absorb or reflect) the radiation outside that bandwidth. Each sector (or segment) would have its diffractive geometry configured or patterned (i.e., it would have a zone plate or phase plate or blazed phase plate pattern or other diffractive focusing pattern formed on the sector or segment) such that for its bandpass ($\Delta\lambda$) it would have a focal length f, and that focal length would be the same for (or not significantly different from) all the segments or sectors in the lens. In this way, a single lens made up of two or more sectors or segments could be illuminated with broadband radiation and produce a single broadband focus or broadband image. The invention includes all geometrical shapes for the segments or sectors making up the BBDL. For example, the individual segments or sectors could be annular, or they could be radial or pie shaped segments, or they could even be chosen to have randomly shaped boundaries.

In another embodiment, a "Serial Stack of Minus Filters" (SSMF) is used to make up the BBDL. An ideal "minus" filter has the property that it will pass all radiation not included in a narrow bandwidth $\Delta\lambda$, while radiation within bandwidth A), will be rejected (e.g., absorbed or reflected) by the minus filter. The minus filter concept is expanded to include an idealized "phase" minus filter which has the property that radiation within bandwidth $\Delta\lambda$ undergoes a phase shift which is not 0 or $2\pi$ or some multiple of $2\pi$ (which can be controlled to improve efficiency), whereas the lo radiation outside the $\Delta\lambda$ spectral band is passed with a phase shift equal to zero, $2\pi$ or some multiple of $2\pi$.

In the second embodiment (i.e., SSMF), each minus filter is geometrically configured or patterned to produce a diffractive lens with a focal length f for radiation within its bandwidth $\Delta\lambda$. Each geometrically configured or patterned minus filter acts as a diffractive lens which focuses or images the radiation within its bandwidth ($\Delta\lambda$), but allows all out-of-bandwidth radiation to pass virtually unaffected. The Broadband Diffractive Lens (BBDL) is thereby made up by putting together a stack of such minus filters, in series, such that each filter modulates a complementary narrow bandwidth ($\Delta\lambda$), and is geometrically configured or patterned to produce the same (or insignificantly different) focal length as the other geometrically configured or patterned minus filters in the stack. Such a stack of ideal minus filters, with appropriate diffractive geometrical configurations, would thereby be able to focus or image broadband incident radiation.

In a combined embodiment, a combination of the first two may be utilized, i.e., sectors or segments with minus filters. The number of minus filters in the stack will be determined by the number of wavelength bands and the number of sectors or segments will be determined by the number of foci.

The invention also comprises the fabrication processes used to make a Broadband Diffractive Lens or Imaging Element. These processes are described in the present application.

Although the description of the invention discusses ideal narrowband filters and ideal minus filters and ideal Fresnel zone diffractive geometries, it is also intended to cover all embodiments which incorporate non-ideal approximations to the proposed configurations and concepts.

The broadband diffractive lens according to the invention is indeed a compact lens, not a separated "optical system" and therefore does not suffer from the product of inefficiencies of its components. Even in the second approach, which uses the series of stacked minus filters (SSMFs), each minus filter in the stack modulates only the radiation within its design bandwidth and passes the other radiation virtually unaffected. In this way, the inefficiencies of the minus filters in the stack do not compound serially.

The Broadband Diffractive Lens will have application in many regions of the electromagnetic spectrum and can also be used in the focusing and imaging of non-electromagnetic radiation (e.g., in diffractive lenses for focusing low energy neutrons or atoms or ions). The BBDL, because it is a diffractive lens, can also provide bifocal and multifocal imaging capabilities.

Additionally, the invention is intended to include (but not be restricted to) the application of the Broadband Diffractive Lens or Imaging Element concept to:

a. Intraocular lenses with high (greater than 10 diopters) dioptric power.

b. The correction of chromatic aberration problems in diffractive contact lenses (this is intended to apply to diffractive contact lenses used either in a stand alone mode or in conjunction with a refractive lens).

c. The correction of chromatic aberrations in any diffractive optic, holographic optic, or binary optic.

d. Focussing and imaging optics used with broadband lasers, multifrequency lasers, wavelength unstable lasers, semiconductor lasers, or diode lasers.

e. Focussing, imaging, or transfer optics requiring chromatic aberration correction for use in:
  1) Optical communications applications
  2) Optical and infra-red radar applications
  3) Point of sale optical scanners
  4) Laser printers
  5) Flat panel displays
  6) Optical encodina
  7) Optical memory devices f. White light hologram applications.

g. The fabrication of inexpensive aspheric, chromatically corrected lenses.

h. The fabrication of inexpensive, large diameter chromatically corrected lenses.

i. The use of color corrected, binary lens arrays for solar radiation collector applications.

j. Applications requiring color corrected optics which are lightweight, such as airborne or space applications.

k. Applications requiring color corrected optics which are flexible and compact and easily placed in areas of limited space or difficult access.

l. Binary optics applications requiring chromatic aberration correction.

In the above applications (items a thru l) the term chromatic correction or chromatic aberration correction is intended to include both total or partial correction of the chromatic aberrations normally associated with prior diffractive structures. The specific degree of chromatic aberration correction is a design parameter of the lens or imaging system.

The BBDL may be particularly useful at infrared, ultraviolet, deep ultraviolet, soft x-ray, and hard x-ray wavelengths where options for refractive lenses are limited. In such applications, diffractive lenses with broadband focusing and imaging capabilities will be a new and welcome optical component.

This invention is intended to include all, but not be restricted to, the above described applications of the BBDL.

BRIEF DESCRIPTION OF THE DRAWINGS

FIG. 1A shows a front view.

DETAILED DESCRIPTION OF THE INVENTION

This invention provides a broadband diffractive lens which is able to produce a sharp focus and/or a high resolution image using a significantly broader bandwidth of illuminating radiation than the conventionally acceptable narrow bandwidth for diffractive lenses. (The conventionally acceptable (narrow) bandwidth is defined as $\Delta\lambda = \lambda/N$, where $\Delta\lambda$ is the conventional (narrow) bandwidth of illumination for diffraction limited performance of a diffractive lens, $\lambda$ is the central wavelength within the band of radiation, and N is the number of Fresnel zones of the diffractive lens).

The invention provides for two approaches or a combination thereof to achieving a broadband diffractive lens: the diffractive lens is sectored or segmented into narrowband filtered regions, each accommodating (i.e., focusing or imaging) a distinct narrowband of radiation, but all segments or sectors having a common focal length; and the diffractive lens is formed of a serial stack of minus filters (SSMF), each accommodating (i.e., focusing or imaging) a distinct narrowband of radiation while passing all other wavelengths, all filters having a common focal length.

Sectored or Segmented Diffractive Lens (SSDL)

Figure 1A:
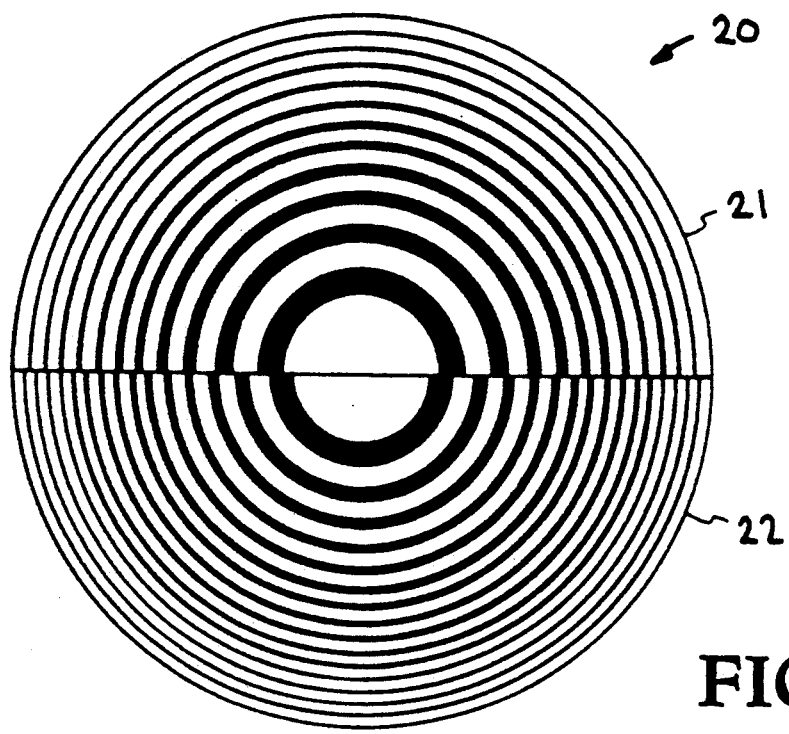
FIGS. 1A and B illustrate a sectored diffractive lens having a Fresnel zone structure divided into two sectors or segments.
Figure 1B:
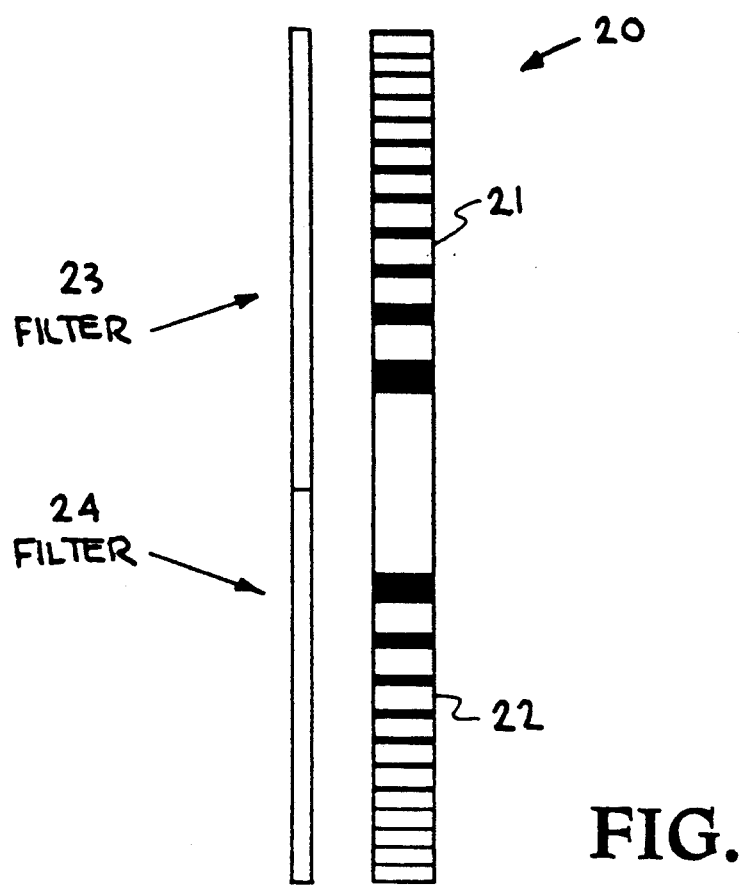
FIG. 1B shows a side view illustrating the filtration of the incident radiation.

A particular example of the SSDL is illustrated in FIGS. 1A and B. Shown is a Fresnel zone structure 20 divided into two segments 21, 22. In this example, the top segment 21 would have its Fresnel zone boundaries given by $$r_n^2 = n\lambda_T f + n^2 \lambda_T^2/4$$

from equations (1) and (2). Similarly, the bottom segment 22 would have its Fresnel zone boundaries given by $$r_n^2 = n\lambda_B f + n^2 \lambda_B^2/4$$

$\lambda_T$ and $\lambda_B$ are different wavelengths, but the focal lengths, f, of the two segments are the same. In addition, the radiation incident on the top segment 21 would be filtered by filter 23 to allow only a narrowband of radiation $\Delta\lambda_T$ centered about $\lambda_T$. Similarly, the radiation incident on the bottom segment would be filtered by filter 24 to allow only a narrowband of radiation $\Delta\lambda_B$ centered about $\lambda$. Although the filters are shown in a spaced relationship to the Fresnel structure, the spacing can be very small, or the filters may contact the Fresnel structure. Alternatively, in place of separate filters 23, 24 the filters may also be incorporated into the Fresnel structure itself, e.g., by using suitable dyes with the necessary absorption characteristics. In this way, the simple diffractive structure illustrated in FIGS. 1A, B could focus incident radiation of composite bandwidth $\Delta\lambda_T + \Delta\lambda_B$ to a single focal spot or it could produce a single broadband (i.e., $\Delta\lambda_T + \Delta\lambda_B$) image.

Figure 2:
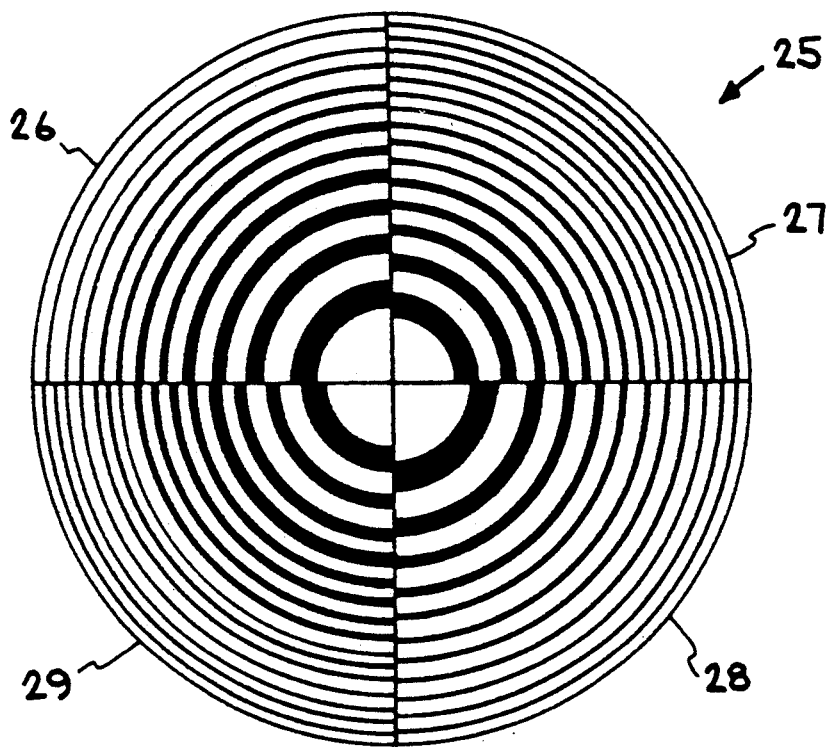
FIG. 2 illustrates a sectored diffractive structure divided into four quadrants which could accommodate four or fewer separate spectral bandwidths.
Figure 4:
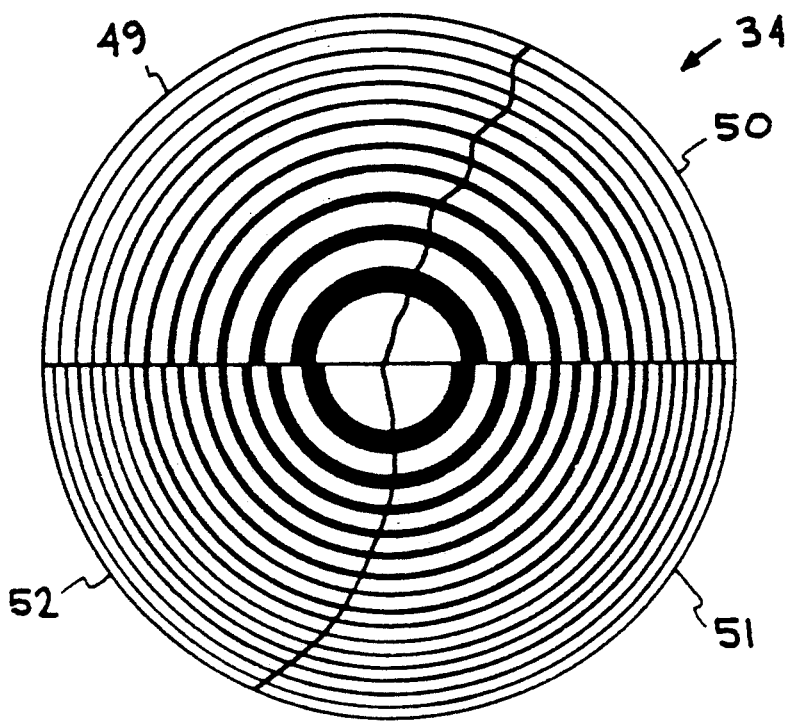
FIG. 4 illustrates a sectored diffractive structure divided into four irregularly shaped segments.
Figure 3:
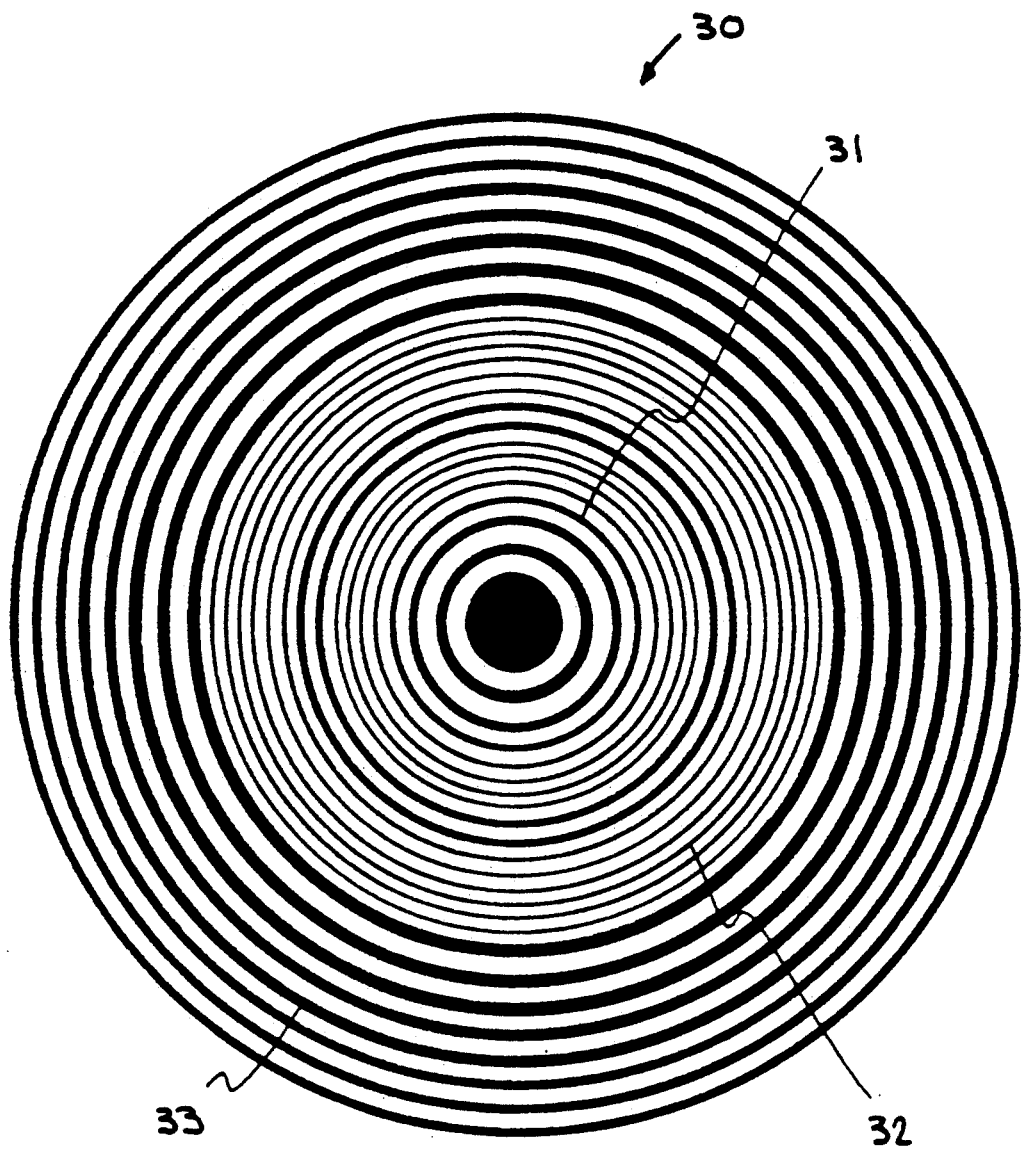
FIG. 3 illustrates a sectored diffractive structure divided into three circularly symmetric annular segments.

The invention also includes possible variations in the number of sectors (or segments) and variations in their shapes. For example, FIG. 2 shows a structure 25 divided into four quadrants 26, 27, 28, 29. These four quadrants can be geometrically configured and filtered to accommodate four separate bandwidths ($\Delta\lambda_1$, $\Delta\lambda_2$, $\Delta\lambda_3$, $\Delta\lambda_4$), all having a common focal length. However, for reasons of symmetry, it may be decided to use four quadrants to accommodate only two separate bandwidths (e.g., $\Delta\lambda_1$, $\Delta\lambda_2$, $\Delta\lambda_2$ in the four quadrants respectively, i.e., sectors 26, 28 at one wavelength and sectors 27, 29 at the other). In general, the invention is intended to include expansion and variation of the sectored diffractive lens concept to include as much of the electromagnetic spectrum as is desired (e.g., by increasing the number of sectors), and/or to control the "color" balance in the broadband images by controlling the size of individual sectors and/or controlling the transmission through the filters used on specific sectors or segments. FIG. 3 provides an additional example of a sectored or segmented lens with differently shaped sectors. Shown in FIG. 3 is a diffractive structure 30 divided into three annular segments 31, 32, 33, i.e., circularly symmetric segments confined within radial bands. As with the pie-shaped sectors, the incident radiation within each annular radial band would be filtered to pass only a narrowband, $\Delta\lambda$, centered about a wavelength, $\lambda_o$, and the Fresnel zones within that radial band would satisfy the equation $$r_n^2 = n\lambda_o f + n^2 \lambda_o^2 / 4 \text{ for } r_x \leq r_n \leq r_y \leq$$

where $r_x$, $r_y$ are the radial boundaries of the annular segment. The other annular segments would accommodate different bandwidths of radiation, but, as before, all would have a common focal length. FIG. 4 illustrates another example of a sectored lens with differently shaped sectors. Diffractive structure 34 is divided into four irregularly shaped segments 49, 50, 51, 52.

Broadband Diffractive Lens Using a Serial Stack of Minus Filters

Figure 5A:
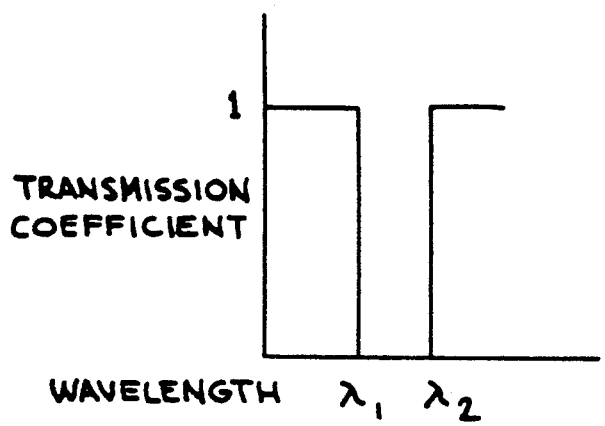
FIGS. 5a–5g illustrate various minus filter characteristics and embodiments.

This particular embodiment of the broadband diffractive lens utilizes the minus filter. The minus filter is described in Alfred Thelen, *Design of Optical Interference Coatings*, Ch. 7, pp. 147-155, McGraw Hill (1989). FIG. 5A illustrates the effect of an idealized minus filter. The filter absorbs radiation only within a narrow band, $\Delta\lambda = \lambda_2 - \lambda_1$, and passes al l other radiation unaffected.

Figure 5B:
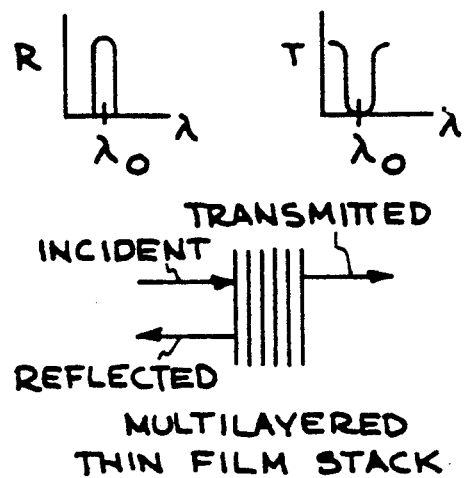

This may be achieved using multilayer thin films which provide a high reflectivity at a resonant wavelength $\lambda_o$ within the bandwidth $\Delta\lambda$, as shown in FIG. 5b. Preferably, these films have a thickness $\lambda_o/4n$, where n is the index of refraction of the film material. The greater the number of films, the more the filter approximates an idealized minus filter. $\lambda_o$ and $\Delta\lambda$ may be engineered by specifying the spacing (i.e., thickness) of the multilayer films and the number of multilayers, respectively.

Figure 5C:
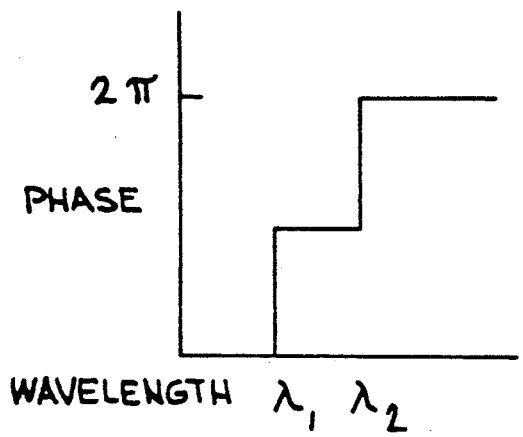
Figure 5D:
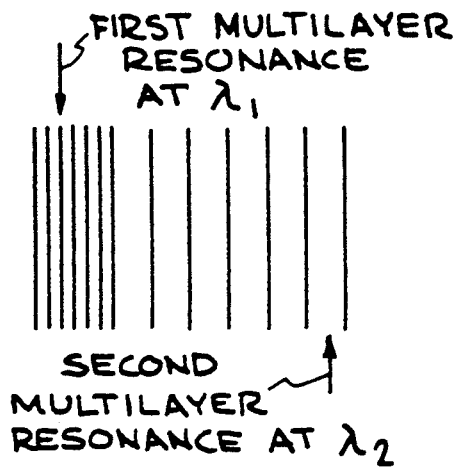
Figure 5E:
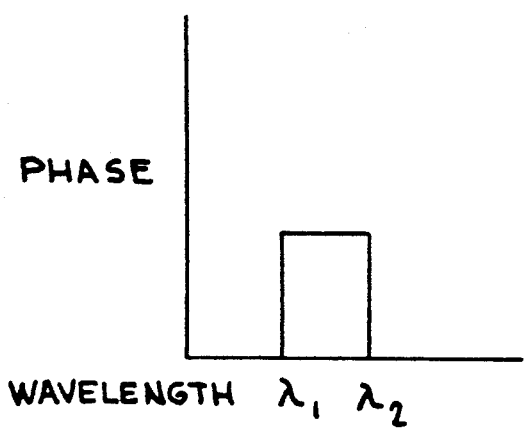

An idealized "phase minus" filter, shown in FIGS. 5c and 5e, provides a finite, but not 0 or $2\pi$ or some multiple of $2\pi$ phase shift for radiation within a bandwidth $\Delta\lambda = \lambda_2 - \lambda_1$, but passes all other radiation with a phase shift of either zero, $2\pi$ or some multiple of $2\pi$. In accordance with the invention, a minus filter, "phase-step", or "phase-notch" minus filter (as illustrated in FIGS. 5a, 5c, or 5e, respectively) operating on a narrow band of radiation $\Delta\lambda_a$, centered at wavelength $\lambda_a$ ($\lambda_1 < \lambda_a < \lambda_2$), when patterned with a Fresnel structure having Fresnel zones placed at $r_n$ such that $$r_n^2 = n\lambda_a f + n^2 \lambda_a^2 / 4$$

will focus the incident $\Delta\lambda_a$ to a virtually diffraction limited spot (for $\Delta\lambda_a \geq \lambda_a/N$) with a focal length f, and will pass the radiation outside bandwidth $\Delta\lambda_a$ virtually unaffected. A second minus or phase minus filter placed in series with the first, but operating on a separate narrow bandwidth $\Delta\lambda_b$ centered at $\lambda_b$ ($\lambda_1 < \lambda_b < \lambda_2$) and patterned with a Fresnel structure having Fresnel zones placed at $r_n$ such that $$r_n^2 = n\lambda_b f + n^2 \lambda_b^2 / 4$$

will serve to focus the incident $\Delta\lambda_b$ band to the same focal spot and pass the "out of bandwidth" radiation virtually unaffected. Thus, a serial stack of such appropriately chosen minus or phase minus filters with appropriately patterned Fresnel structures produces a single broadband focus of the incident radiation. Such a diffractive lens would have a single focal length for the broadband of incident radiation, and, as such, could produce high resolution images of broadband sources of radiation.

An embodiment of a phase-step filter with the characteristics shown in FIG. 5c is shown in FIG. 5d. This is comprised of a "double" stack of multilayer thin films such that the first stack has a resonant reflection at wavelength $\lambda_1$ and the second at wavelength $\lambda_2$. Now at each resonance the transmitted radiation undergoes a relative phase shift of $\pi$.

So:

for $\lambda < \lambda_1$ the relative phase shift is zero
for $\lambda_1 < \lambda < \lambda_2$ the relative phase shift is $\pi$
for $\lambda > \lambda_2$ the relative phase shift is $2\pi$ In this example, the phase shift is $\pi$. Preferably, the films have thicknesses $\lambda_1/4n_1$, $\lambda_2/4n_2$, where $n_1$ and $n_2$ are the indices of refraction of the first and second film materials respectively. Again, the greater the number of films the more the filter approximates an ideal phase-step filter.

Figure 5F:
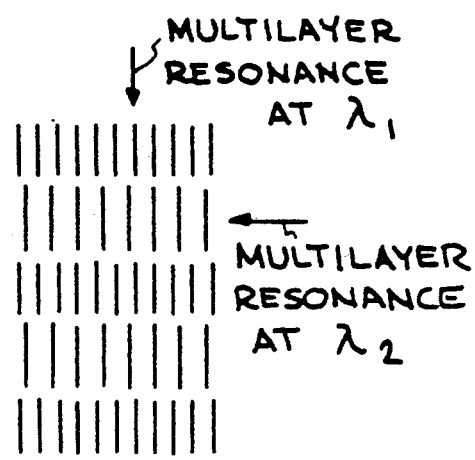

An embodiment of a phase-notch filter with the characteristics shown in FIG. 5e is shown in FIG. 5f.

Consider a Fresnel zone structure in which the adjacent zones are made up of different multilayer thin films, such that the even zone multilayers have a resonance at $\lambda_2$ and the odd zone multilayers have a resonance at $\lambda_1$.

Then for:

$\lambda < \lambda_1$ the relative phase between adjacent zones is zero $\lambda_1 < \lambda < \lambda_2$ the relative phase between adjacent zones is $\pi$ $\lambda > \lambda_2$ the relative phase between adjacent zones is zero So that for this Fresnel zone patterned multilayer structure the relative phase between adjacent zones is spectrally modulated as a phase notch filter. Note that in this example the phase shift is $\pi$ also, but in general it may have any value between 0 and $2\pi$. As above, the film thicknesses may be $\lambda_1/4n_1$, $\lambda_2/4n_2$.

Figure 5G:
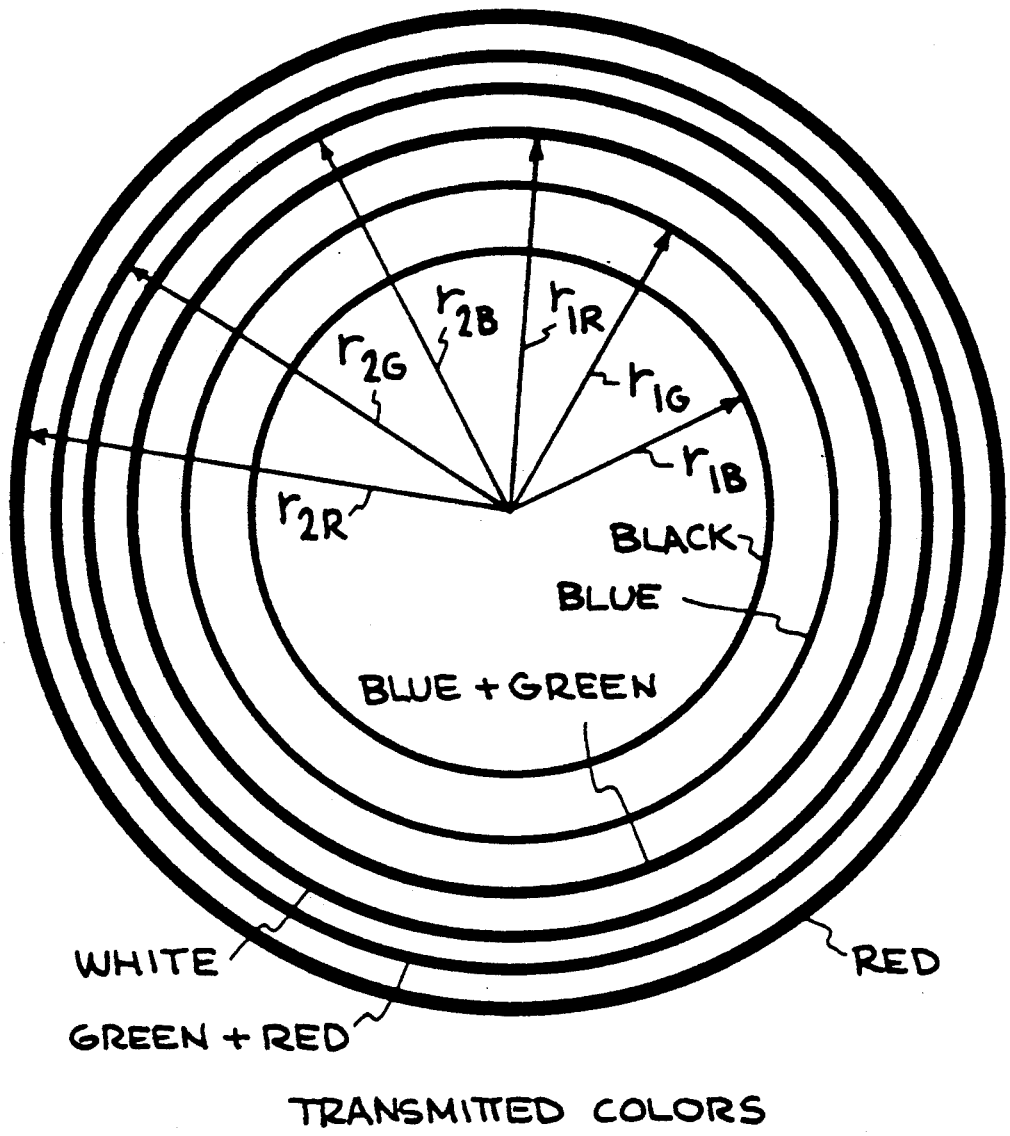

Although the concept and performance of the broadband diffractive lens or imaging element is most easily described and understood in terms of the serial stack of minus filters wherein each minus filter element has a diffractive structure patterned into it, there are other technological methods whereby the same spectral and spatial modulation of the incident radiation may be achieved. In such cases the lens or imaging element thereby produced will have the equivalent broadband properties as the diffractive serial stack of minus filters. An example of such a technological equivalent follows:

Using high resolution, color, photographic transparency films one may be presumed to be able to achieve a succession of well defined rings which transmit well defined colors. In this case we could produce a pattern of color transmitting rings which mimic the colored transmission of a zone plate patterned serial stack of minus filters. For example, if we have a serial stack of minus filters which are patterned with zone plate structures such that filter $R$ modulates red and has $r_{1R} = \sqrt{f \lambda_R}$ filter $B$ modulates blue and has $r_{1B} = \sqrt{f \lambda_B}$ filter $G$ modulates green and has $r_{1G} = \sqrt{f \lambda_G}$ then when illuminated with white light the colored pattern of transmitted radiation in the inner zones will be as shown in FIG. 5g.

| Radius | Transmitted Color |
| --- | --- |
| $0 \rightarrow r_{1B}$ | black |
| $r_{1B} \rightarrow r_{1G}$ | blue |
| $r_{1G} \rightarrow r_{1R}$ | blue & green |
| $r_{1R} \rightarrow r_{2B}$ | white |
| $r_{2B} \rightarrow r_{2G}$ | green & red |
| $r_{2G} \rightarrow r_{2R}$ | red |
| etc. | |

This transmitted color pattern could be simulated using high resolution photographic transparency film or by a number of other filter technologies. This patent is intended to relate to all techniques of diffractive optics combined with techniques of filtration to produce color corrected diffractive lenses.

Figure 6:
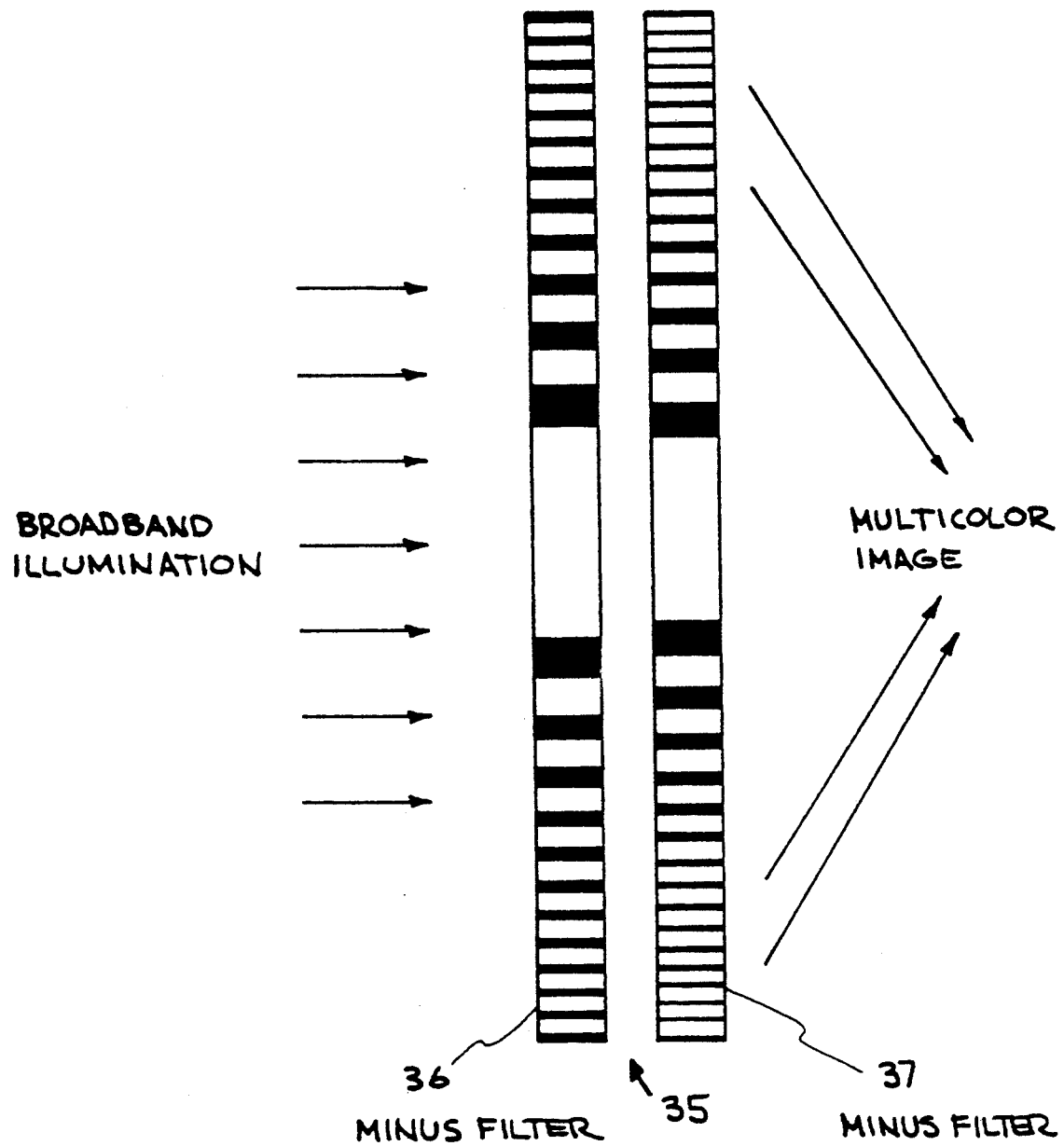
FIG. 6 illustrates a broadband diffractive lens made up of a serial stack of two minus filters patterned to provide a common focus. The separation between the two filters can be negligibly small.

An illustration of a serial stack 35 of two minus filters 36, 37 patterned to provide a common focus for two separate bands of radiation is shown in FIG. 6. The first minus filter 36 focuses or images a first band $\Delta\lambda_1$ centered at $\lambda_1$ while passing a second band $\Delta\lambda_2$ centered at $\lambda_2$ unaffected. The second band is focused or imaged by second minus filter 37 which passes the first band unaffected. Thus, stack 35 focusses or images the combined band $\Delta\lambda_1 + \Delta\lambda_2$ at a common focus or image plane. Although minus filters 36, 37 are shown in a spaced relationship, the spacing can be very small or the filters can contact each other.

The invention also includes broadband diffractive lenses made up of serial stacks which include non-ideal approximations to the minus filters and phase minus filters discussed herein.

The invention also includes the options of patterning the minus filter stack with Fresnel zone plate patterns (i.e., alternately transparent and opaque Fresnel zones), with Fresnel phase plate patterns (i.e., providing a phase shift difference of $\pi$ between adjacent Fresnel zones), with blazed Fresnel phase plate patterns (i.e., Fresnel structures wherein the phase of the incident wave is adjusted continuously from 0 to $2\pi$ over each adjacent pair of Fresnel zones), with generalized holographic diffractive patterns, or with any approximation to the above-cited diffractive patterns.

Broadband Multifocal Diffractive lens

Figure 7:
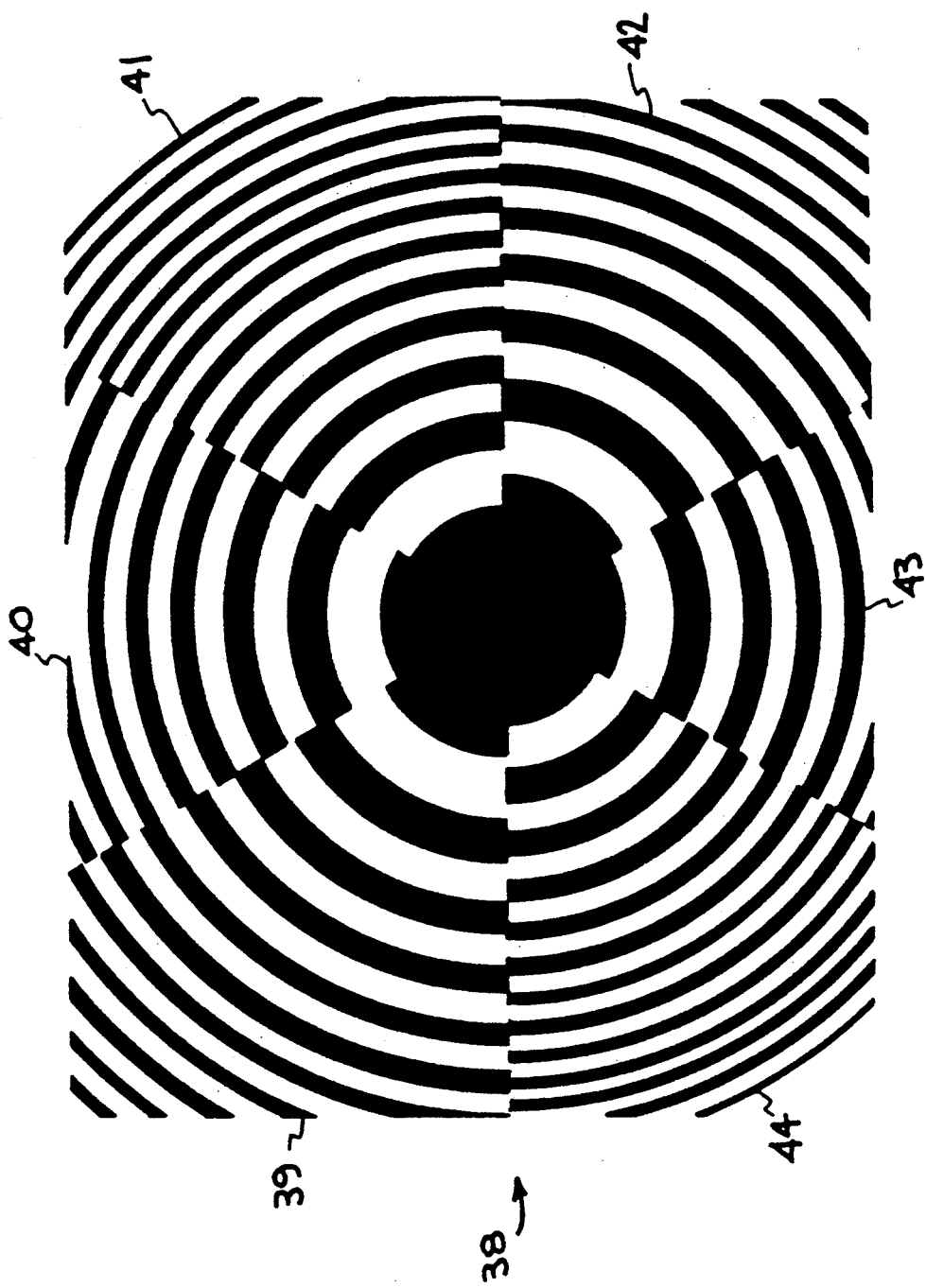
FIG. 7 illustrates a bifocal, broad band diffractive lens made up of six sectors. The lens focuses three bands of radiation to each of two foci and is intended for bifocal applications.

It is also intended as part of this invention to include the application of the above-described Broadband Diffractive Lens to bifocal and multifocal diffractive lens schemes, e.g., intraocular or corneal lenses as described in U.S. patent application Ser. No. 495,073 filed Mar. 19, 1990. For example, FIG. 7 shows a bifocal, sectored diffractive lens 38. In this case, the lens is divided into six sectors, 39, 40, 41, 42, 43, 44. The top three sectors 39, 40, 41 are filtered and configured for a single focal length, $f_1$, for three bands of radiation (e.g., a narrowband in the red $\Delta\lambda_R$, in the green $\Delta\lambda_G$, and in the blue $\Delta\lambda_B$). The bottom three sectors 42, 43, 44 are filtered and configured for a different focal length, $f_2$, for the same three bands of radiation ($\Delta\lambda_R$, $\Delta\lambda_G \Delta\lambda_B$). In this way, a bifocal Broadband Diffractive Lens can be made. In similar fashion, the invention can be extended to produce multifocal (i.e., three or more foci) broadband diffractive lenses. It is also intended, as part of this invention, that by simple extension of these concepts, bifocal and multifocal diffractive lenses with "designer" (i.e., specifically designed or custom designed) bandwidths can be constructed. For example, it is intended to include the possibility of applications which have a specific bandwidth (e.g. $\Delta\lambda_R$, $\Delta\lambda_G$, $\Delta\lambda_B$) for focal length $f_1$, but a very different or slightly different bandwidth for focal length $f_2$, etc. Such a capability could be quite useful for applications in which the radiation coming from a distance (e.g., need longer focal length) has a spectrum quite different from the radiation coming from nearby sources (e.g., need shorter focal length). In this application, a bifocal broadband diffractive lens with different bandwidths (suited to the spectra of the different sources) for the different foci could be quite useful.

Figure 8:
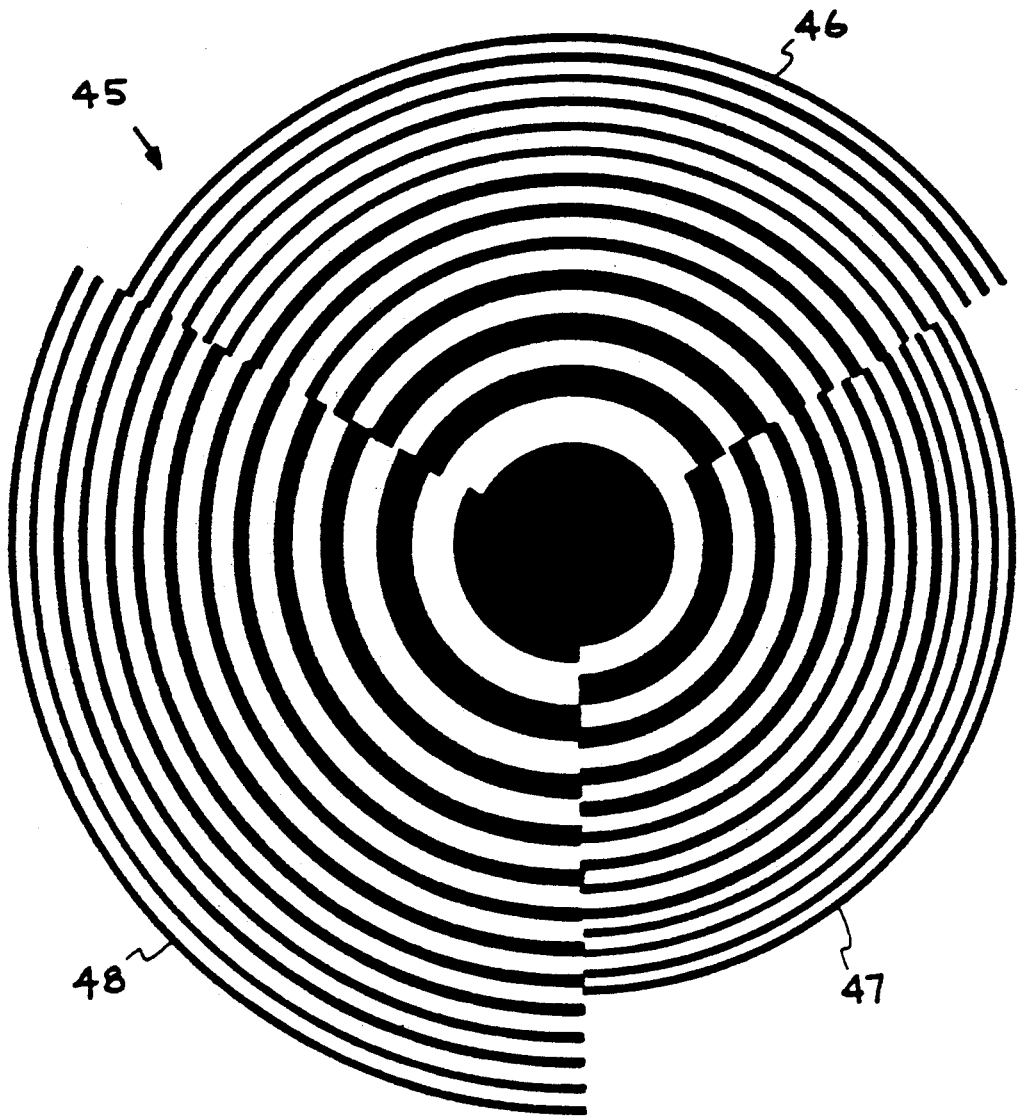
FIG. 8 illustrates a front view of a composite broadband diffractive lens in which a serial stack of minus filters is divided into three sectors producing a tri-focal lens with each focus having an identical, broadband of radiation concentrated at its focal point. The diameters of the three focal segments are shown as different, but, in general, they need not be.

It is also intended, as part of this invention, to include broadband diffractive lenses which are a combination or composite of both approaches, for example, a serial stack of minus filters which are sectored. In such a lens the need for filtering the sectors is obviated by the presence of the serial stack of minus filters. Such a composite broadband diffractive lens could serve ideally as a bifocal or multifocal broadband diffractive lens. For example, FIG. 8 shows a sectored minus filter 45 having three sectors 46, 47, 48. A plurality of sectored minus filters 45 can be stacked, similar to the stack arrangement shown in FIG. 6. For example, four minus filters 45 each having three sectors 46, 47, 48, can be stacked. The four minus filters provide for four different wavelength bands ($\Delta\lambda_1$, $\Delta\lambda_2$, $\Delta\lambda_3$, $\Delta\lambda_4$); thus the number of bands determines the number of minus filters in the stack. The number of segments in each minus filter determines the number of foci. For example, the four minus filter sectors in position 46 all have one focus, while the four minus filter sectors in position 47 have a second focus and the four in position 48 have a third focus. The minus filter stacks in each of the sectors can be the same (though they need not be) so that each of the three sectors will focus the same broad bandwidth of radiation. However, the diffractive patterning in the three sectors is different so that the lens will be tri-focal. As shown, the diameters of the three focal segments 46, 47, 48 are different, but, in general, they can be the same.

Processes

The invention is intended to include, but not be restricted to, the following processes for fabrication of the Broadband Diffractive Lens or Imaging Element.

The deposition of multilayer thin films of, but not limited to materials such as magnesium fluoride, calcium fluoride, lithium fluoride, zinc-sulfide, and quartz onto an optically transparent or optically reflecting substrate made of a material such as glass or plastic (transparent), or metallized glass or plastic (reflective). Typical materials are mentioned in "Optical Waves in Layered Media", by Pochi Yeh, (1988). Said deposition to be accomplished by any of a variety of processes including, but not restricted to, vacuum evaporation, sputtering (discharge sputtering or ion beam sputtering), chemical vapor deposition, atomic layer epitaxy or molecular beam epitaxy techniques.

The patterning of a diffractive structure into or onto the multilayer thin film using lithographic techniques and processes including, but not restricted to, optical, ultraviolet, x-ray or e-beam lithography, and/or ion beam implantation. Subsequent etching of the pattern into the multilayer using any of a variety of processes including, but not restricted to, liquid etching, plasma or discharge etching, and/or sputtering via ions or neutral particles.

Figure 11:
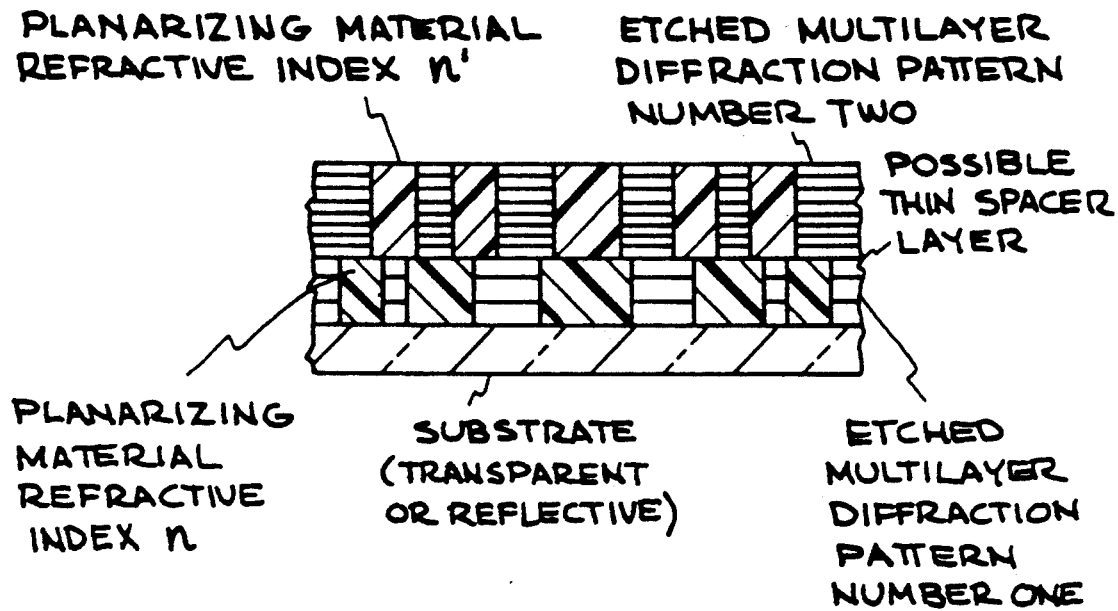
FIG. 11 shows a general serial diffractive structure.
Figure 12:
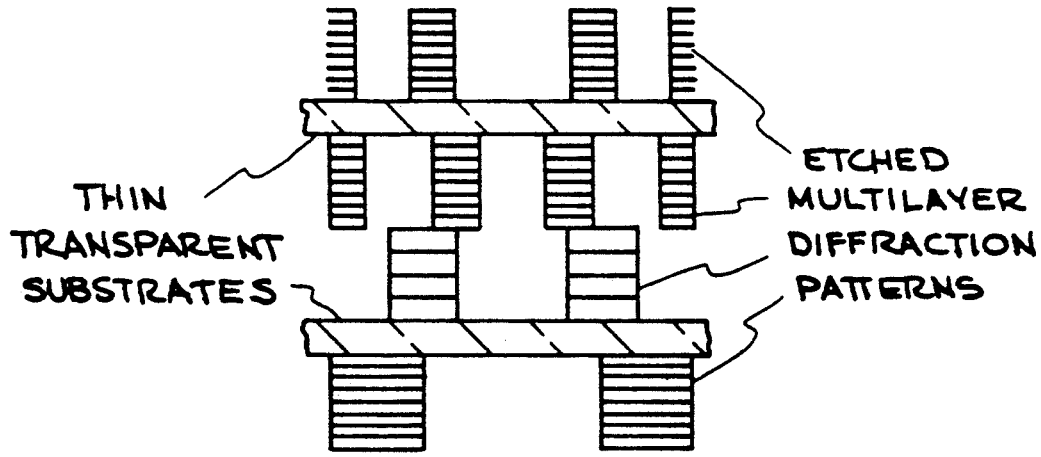
FIG. 12 shows a double-sided serial stack diffractive structure with plural substrates.
Figure 13:
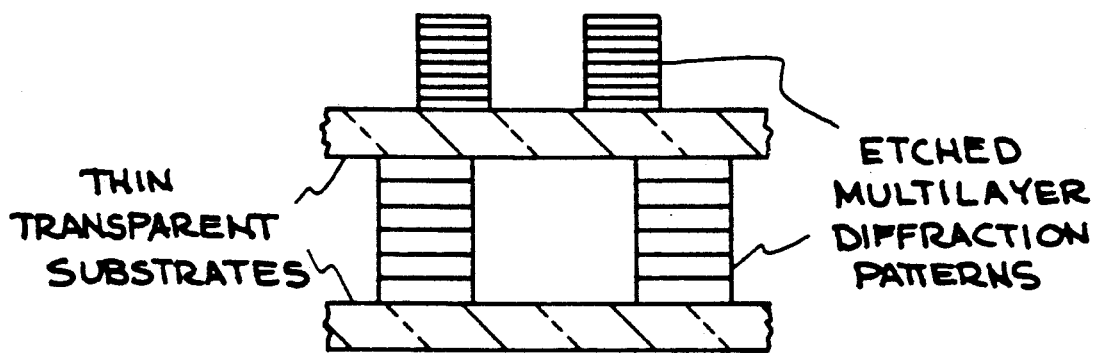
FIG. 13 shows a single-sided serial stack diffractive structure with plural substrates.

FIGS. 11-14 show serial stacks of diffractive structures etched into multilayer thin films, each diffractive structure having its own specific diffractive geometry—wherein, the serial stack may be produced as follows:

a) The initial multilayer film is deposited, lithographically patterned and then etched. The etched grooves are subsequently filled with a polymer or other transparent material of suitably chosen refractive index to produce a relatively flat surface. Then, the process is repeated on top of this first etched multilayer (or on top of a thin layer of planarizing material), in order to produce a second element of the stack of multilayers. The process is repeated to produce as many elements of the serial stack of multilayers as is desired. This is illustrated in FIG. 11.

b) FIGS. 12 and 13 show an etched diffractive pattern in a multilayer film is produced on one or both sides of a thin transparent substrate material. A serial stack of such etched multilayers may thereby be accomplished by appropriately registering and stacking the substrate supported patterns on top of one another—as illustrated in FIGS. 12 and 13.

Figure 14:
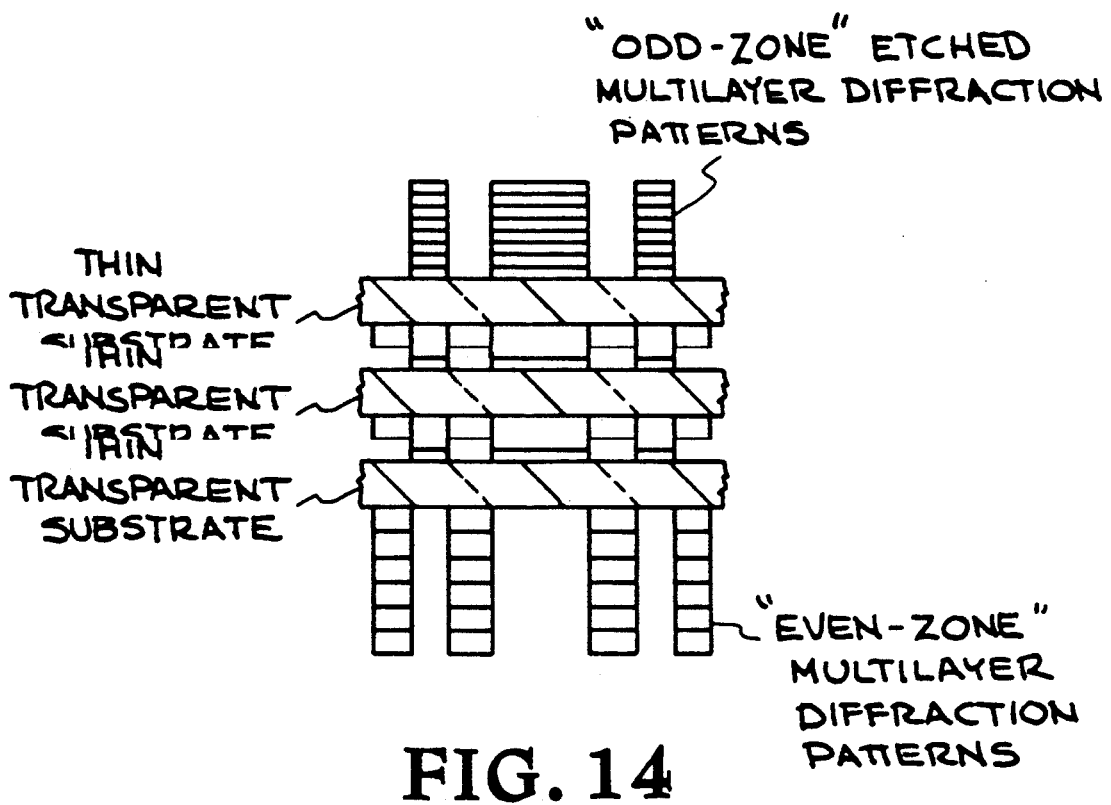
FIG. 14 shows a diffractive structure in which adjacent zones are made up of different multilayer thin films.

The production of a phase minus or phase notch diffractive structure comprised of a Fresnel zone or diffractive structure in which adjacent zones are made up of different multilayer thin films, accomplished by producing the "odd-zone" etched multilayer diffractive structure on one side of a thin, transparent substrate and the "even-zone" etched multilayer diffractive structure on the opposite side of the thin, transparent substrate, is illustrated in FIG. 14.

DESCRIPTION OF THE PREFERRED EMBODIMENTS

The invention is a lens or imaging element which achieves focusing and/or imaging primarily by diffraction and is capable of focusing and/or imaging radiation of a bandwidth much broader than conventional diffractive lenses or imaging elements using the above described principles. The invention includes, but is not limited to, the following specific embodiments.

Embodiment 1: A sectored or segmented diffractive lens is made of a number of sectors, as few as 2 or as many as 20 or more, in which the individual sectors have narrowband filters and the diffractive patterns in the individual sectors are Fresnel zone plate patterns (i.e., amplitude modulated zones). The shapes of the sectors or segments can be chosen to meet the needs of applications. The sectors or segments can be annular rings, pie shaped sectors, or even randomly shaped segments.

Embodiment 2: The same as Embodiment 1 except that the diffractive patterns in the individual sections are Fresnel phase plate patterns (i.e., phase modulated zones).

Figure 9:
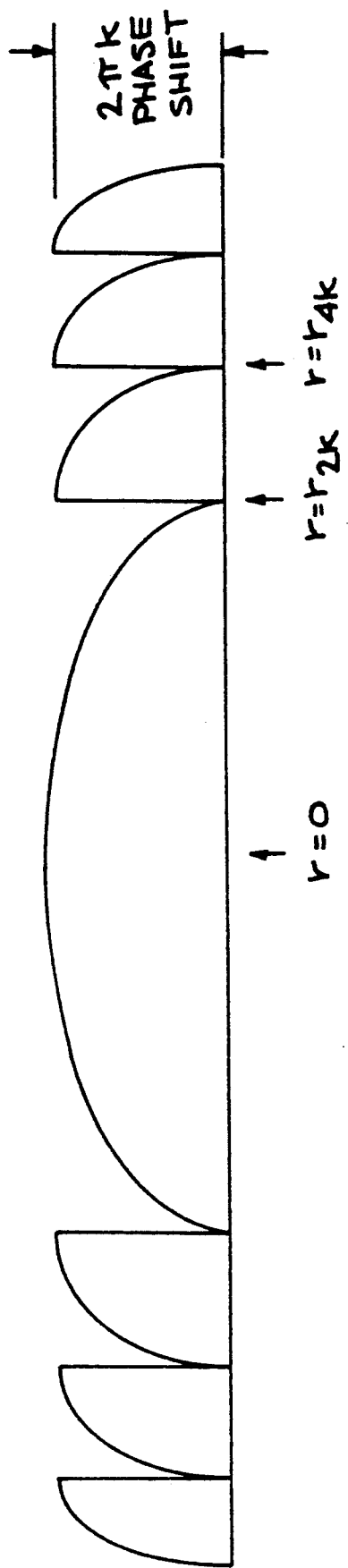
FIG. 9 illustrates the design of a blazed Fresnel phase plate of modulo k.

Embodiment 3: The same as Embodiment 1 except that the diffractive patterns in the individual sectors are blazed Fresnel phase plates of modulo k (where k is an integer), i.e., where the phase shift through the pattern is varied continuously from 0 to $2\pi k$ over 2k adjacent Fresnel zones as shown in FIG. 9.

Figure 10:
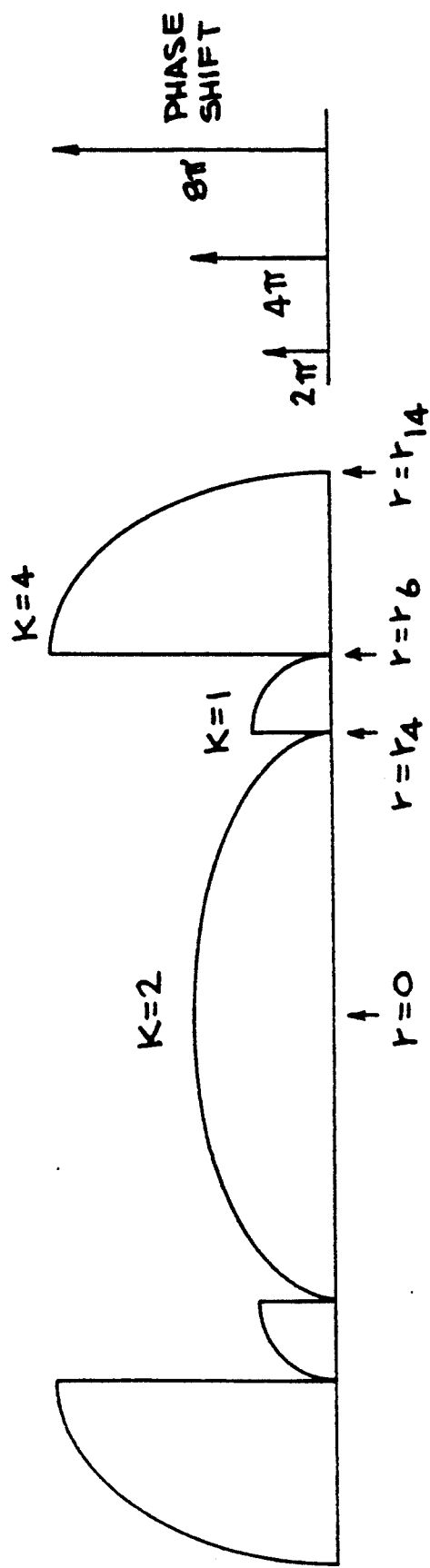
FIG. 10 illustrates the design of a blazed Fresnel phase plate of radially variable modulo. I

Embodiment 4: The same as Embodiment 3 except that the diffractive patterns in the individual sectors are blazed Fresnel phase plates for which the integer modulo (k) may be varied throughout the radial distribution. For example, FIG. 10 shows a BFPP such that over zones 1 through 4 the phase shift provided by the pattern varies continuously from 0 to $4\pi$ (i.e., modulo but over zones 5 and 6 the phase shift is varied continuously from 0 to $2\pi$ (i.e., modulo 1), whereas over zones 7 through 14 the phase shift is varied continuously from 0 to $8\pi$ (i.e., modulo 4), etc.

Embodiment 5: The same as Embodiment 1 except that the diffractive pattern in the individual sectors can be any generalized holographic focusing pattern of the amplitude modulation or phase modulation type.

Embodiment 6: All the options of Embodiments 1 thru 5 are extended to produce bifocal or multifocal broadband diffractive lenses or imaging elements as described above.

Embodiment 7: A broadband diffractive lens or imaging element is made up of a serial stack of minus filters, and the diffractive pattern is a Fresnel zone plate (i.e., amplitude modulated) or any amplitude modulated holographic focusing or imaging element.

Embodiment 8: The same as Embodiment 7 except that the broadband diffractive lens or imaging element is made up of serial stack of "phase-minus" filters, as described above, and the diffractive pattern is a Fresnel phase plate or blazed Fresnel phase plate (of modulo k, as in Embodiment 3, or of variable modulo as in Embodiment 4), or any phase modulated holographic focusing or imaging element.

Embodiment 9: A composite broadband diffractive lens or imaging element made up of a sectored stack of minus filters or phase-minus filters, and which can be used for monofocal or multi-focal imaging.

Embodiment 10: Includes Embodiments 1 through 9 in which approximations to idealized minus filters, or phase-minus filters, or idealized diffractive patterns are used.

Embodiment 11: Includes Embodiments 1 through 10 for application in any region(s) of the electromagnetic spectrum and for focusing or imaging other particles or radiation, such as neutrons, electrons, ions, atoms, etc.

EXAMPLES

Example 1 is an example of Embodiment 3. A lens that can image radiation over a bandwidth from 500 to 560 nm with about a 1 cm focal length and a spatial resolution less than 20 microns (which is not diffraction limited) is formed of a three sector blazed Fresnel phase plate. Each of three sectors is designed to focus a 20 nm bandwidth of radiation. The first sector should have the following characteristics:

$r_1 = 71.41$ microns
$N = 50$
Diameter $\geq 1$ mm
$\Delta r_{min} \approx 5$ microns
filter: transmits from 500 to 520 nm $$f = \frac{r_1^2}{\lambda_1} \approx 1 \text{ cm}$$

$$r_n^2 = nr_1^2 + n^2\lambda_1^2/4 \quad n = 1, N$$

where $\lambda_1 = 510$ nm

The second sector should have the following characteristics:

$r_1 = 72.8$ microns
$N = 49$
Diameter $\geq 1$ mm
$\Delta r_{min} \approx 5.2$ microns
filter: transmits from 520 to 540 nm $$f = \frac{r_1^2}{\lambda_2} \approx 1 \text{ cm}$$

where $\lambda_2 = 530$ nm

The third sector should have the following characteristics:

$r_1 = 74.16$ microns
$N = 47$
Diameter $\geq 1$ mm
$\Delta r_{min} \approx 5.4$ microns
filter: transmits from 540 to 560 nm $$f = \frac{r_1^2}{\lambda_3} \approx 1 \text{ cm}$$

where $\lambda_3 = 550$ nm

The first sector is designed to operate at 510 nm, and focuses the radiation from 500 to 520 nm. The second sector is designed to operate at 530 nm and focuses the radiation from 520 to 540 nm. The third sector is designed to operate at 550 nm and focuses the radiation from 540 to 560 nm.

Example 2 is an example of Embodiment 7. A lens with similar performance to Example 1 can be fabricated using minus filters. Three minus filters are patterned with Fresnel zone plate patterns. The first patterned minus filter has the following characteristics:

$r_1 = 71.41$ microns
$N = 50$
Diameter $\geq 1$ mm
$\Delta r_{min} \approx 5$ microns $$r_n^2 = nr_1^2 + n^2\lambda_1^2/4 \quad n = 1, N$$

$$f = \frac{r_1^2}{\lambda_1} \approx 1 \text{ cm}$$

where $\lambda_1 = 510$ nm

The first minus filter rejects radiation in the band from to 520 nm and passes all out-of-bandwidth radiation. The second patterned minus filter for this lens design has the following characteristics:

$r_1 = 72.8$ microns
$N = 49$
Diameter $\geq 1$ mm
$\Delta r_{min} \approx 5.2$ microns $$f = \frac{r_1^2}{\lambda_2} \approx 1 \text{ cm}$$

where $\lambda_2 = 530$ nm

This minus filter rejects radiation in the band from 520 to 540 nm.

The third patterned minus filter for this lens design has the following characteristics:

$r_1 = 74.16$ microns
$N = 47$
Diameter $\geq 1$ mm
$\Delta r_{min} \approx 5.4$ microns $$f = \frac{r_1^2}{\lambda_3} \approx 1 \text{ cm}$$

where $\lambda_3 = 550$ nm

The minus filter rejects radiation in the band from 540 to 560 nm.

The first minus filter is designed to operate at 510 nm, and focuses the radiation from 500 to 520 nm. The second minus filter is designed to operate at 530 nm and focuses the radiation from 520 to 540 nm. The third minus filter is designed to operate at 550 nm and focuses the radiation from 540 to 560 nm. Thus the bands that are "rejected" by each minus filter are focused or imaged by the diffractive pattern on the corresponding minus filter and pass through all the other minus filters without other effect, so that all the bands are focused or imaged to the same point or plane. Changes and modifications in the specifically described embodiments can be carried out without departing from the scope of the invention which is intended to be limited only by the scope of the appended claims.

We claim:

1. A broadband diffractive lens or imaging element, comprising a diffractive element having a plurality of filtered sectors or segments, each filtered sector or segment having a diffractive geometry patterned thereon for focusing or imaging a different narrowband of filtered radiation, all sectors or segments having substantially the same focal length.

2. The broadband diffractive lens or imaging element of claim 1 wherein the diffractive element is a Fresnel diffractive structure.

3. The broadband diffractive lens or imaging element of claim 2 wherein the diffractive element is selected from Fresnel zone plates, Fresnel phase plates, and blazed Fresnel phase plates.

4. The broadband diffractive lens or imaging element of claim 1 wherein the diffractive element is an amplitude modulation type diffractive element.

5. The broadband diffractive lens or imaging element of claim 1 wherein the diffractive element is a phase modulation type diffractive element.

6. The broadband diffractive lens or imaging element of claim 1 wherein the diffractive element is a holographic focusing or imaging pattern.

7. The broadband diffractive lens or imaging element of claim 1 further comprising a corresponding narrowband filter optically aligned with each sector or segment.

8. The broadband diffractive lens or imaging element of claim 1 wherein the sectors or segments are radial pie-shaped segments.

9. The broadband diffractive lens or imaging element of claim 1 wherein the sectors or segments are annular segments.

10. The broadband diffractive lens or imaging element of claim 1 wherein the sectors or segments have randomly shaped boundaries.

11. The broadband diffractive lens or imaging element of claim 1 wherein the diffractive element is an intraocular or corneal lens.

12. The broadband diffractive lens or imaging element of claim 1 wherein the diffractive element is an element which focuses of images non-electromagnetic radiation selected from neutrons, electrons, atoms and ions.

13. The broadband diffractive lens or imaging element of claim 1 wherein the diffractive element is an element which focuses or images electromagnetic radiation selected from infrared, ultraviolet, deep ultraviolet, soft x-ray and hard x-ray wavelengths.

14. The broadband diffractive lens or imaging element of claim 1 further comprising a second plurality of sectors or segments, each having a diffractive geometry patterned thereon for focusing or imaging a different narrowband of radiation, all sectors or segments of the second plurality having substantially the same focal length which differs from the focal length of the first plurality.

15. The broadband diffractive lens or imaging element of claim 1 further comprising multiple pluralities of sectors or segments, each plurality having a different focal length from the other pluralities.

16. A broadband diffractive lens or imaging element, comprising a serial stack of minus filters, each minus filter of the stack having a diffractive geometry patterned thereon for focusing or imaging a different narrowband of radiation while passing all other wavelengths, all minus filters having substantially the same focal length.

17. The broadband diffractive lens or imaging element of claim 16 wherein the minus filters are phase minus filters.

18. The broadband diffractive lens or imaging element of claim 16 wherein the diffractive geometry is a Fresnel diffractive structure.

19. The broadband diffractive lens or imaging element of claim 16 wherein the diffractive geometry is selected from Fresnel zone plates, Fresnel phase plates, and blazed Fresnel phase plates.

20. The broadband diffractive lens or imaging element of claim 16 wherein the diffractive geometry is an amplitude modulation type diffractive element.

21. The broadband diffractive lens or imaging element of claim 16 wherein the diffractive geometry is a phase modulation type diffractive element.

22. The broadband diffractive lens or imaging element of claim 16 wherein the diffractive geometry is a holographic focusing or imaging pattern.

23. The broadband diffractive lens or imaging element of claim 16 wherein the serial stack of minus filters forms an intra-ocular or corneal lens.

24. The broadband diffractive lens or imaging element of claim 16 wherein the diffractive geometry is an element which focuses or images non-electromagnetic radiation selected from neutrons, electrons, atoms and ions.

25. The broadband diffractive lens or imaging element of claim 16 wherein the diffractive geometry is an element which focuses or images electromagnetic radiation selected from infrared, ultraviolet, deep ultraviolet, soft x-ray and hard x-ray wavelengths.

26. The broadband diffractive lens or imaging element of claim 16 wherein each minus filter of the stack is divided into a plurality of sectors or segments, each sector or segment in a filter having a different focal length.

27. A diffractive lens or diffractive imaging element of claims 1 or 16 with radiation incident thereon having a dioptric power greater than 10 diopters for which chromatic aberrations are corrected.

28. The diffractive lens or diffractive imaging element of claim 27 for which chromatic aberrations are corrected over a field of view as large as 2 mm diameter and over an angular field as large as $+/-10$ milliradians.

29. The diffractive lens or diffractive imaging element of claim 27 for which the chromatic aberrations are corrected to provide diffraction limited performance at three or more different wavelengths, wherein such wavelengths are separated by at least 5 nm.

30. The diffractive lens or diffractive imaging element of claim 16 wherein each minus filter comprises a multilayer thin film stack.

31. A diffractive lens or diffractive imaging element of claim 16 with radiation incident thereon, comprised of a serial combination of two or more optical elements so that incident radiation passes consecutively through the elements, wherein the diffractive geometry is patterned into a material that produces a spectrally selective, minus filter-type modulation of the incident radiation intensity.

32. A diffractive lens or diffractive imaging element of claim 16 with radiation incident thereon, comprised of a serial combination of two or more optical elements so that incident radiation passes consecutively through the elements, wherein the diffractive geometry is patterned into a material that produces a spectrally selective, minus filter-type modulation of the phase of the incident radiation.

33. Apparatus comprising:
an amplitude or intensity modulating multilayer thin film stack comprising a plurality of layers wherein the number, thickness and indices of refraction of the layers is selected to produce high reflectivity at a resonant wavelength $\lambda_o$ within a narrow band $\Delta\lambda$ and to transmit radiation outside $\Delta\lambda$;
a diffraction pattern formed in the multilayer thin film stack, the diffraction pattern being selected to focus or image radiation in the band $\Delta\lambda$ to a focal length f.

34. Apparatus comprising:
a phase modulating multilayer thin film stack comprising a plurality of layers wherein the number, thickness and indices of refraction of the layers are selected to produce a phase shift different from 0, $2\pi$, or a multiple of $2\pi$ at a resonant wavelength $\lambda_o$ within a narrow band $\Delta\lambda$, and to transmit radiation outside $\Delta\lambda$ with a phase shift equal to 0, $2\pi$, or some multiple of $2\pi$;

a diffraction pattern formed in the multilayer thin film stack, the diffraction pattern being selected to focus or image radiation in the band $\Delta\lambda$ to a focal length f.

35. A chromatically corrected multifocal diffractive lens or diffractive imaging element comprising a serial stack of minus filters so that incident radiation passes consecutively through said filters, wherein said filters are arranged in spatially separated segments each having its own focal length.

36. An optical device comprising:

a substrate;

a multilayer thin film stack located on said substrate;

said multilayer thin film stack patterned to have a diffractive geometry and being made of optical materials to allow the passage of radiation therethrough;

wherein the thicknesses and indices of refraction of the layers of said multilayer thin film stack are such that radiation incident upon said optical device undergoes a spectrally selective phase and/or amplitude modulation in a bandwidth $\Delta\lambda$ when passing through said multilayer thin film stack and the diffractive geometry focusses the radiation in the bandwidth $\Delta\lambda$.

37. The device of claim 34 wherein said spectrally selective phase and/or amplitude modulation includes a modulation that changes the phase of a narrow band of radiation by a non-zero value not equal to a multiple of $2\pi$, while leaving the phase of the remaining radiation unaffected to within phase changes of multiples of $2\pi$.

38. The device of claim 34 wherein said spectrally selective phase and/or amplitude modulation includes a modulation that reduces the amplitude of a narrow band of radiation, essentially filtering out said narrow band of radiation, while leaving the amplitude of the remaining radiation unaffected.

39. The optical device of claim 34 wherein said layers comprise a quarter-wavelength stack.

40. The optical device of claim 34 wherein said substrate is reflective.

41. A broadband diffractive lens or imaging element comprising a plurality of concentric color transmitting rings, the radii and color transmissivity of the rings being equal to the radii of rings of different color transmission for a serial stock of minus filters, each minus filter of the stack having a diffractive geometry patterned thereon for focussing or imaging a different narrowband of radiation while passing all other wavelengths, all minus filters having substantially the same focal length.

42. The broadband diffractive lens or imaging element of claim 41 wherein the rings are formed of color transparency film.

43. Apparatus for focussing or imaging broadband radiation having a plurality of narrowbands $\Delta\lambda_1 \ldots \Delta\lambda_N (N \geq 2)$, around wavelength $\lambda_1 \ldots \lambda_N$, respectively, with a common focal length f, comprising a pattern of concentric color transmitting rings having the color transmissivity of a stack of minus filters $F_1 \ldots F_N$ wherein minus filter $F_i$ (i=1 ... N) passes all wavelengths other than wavelength $\lambda_i$ (i=1 ... N) and has a diffractive geometry patterned thereon defined by $r_{ni}^2 = n\lambda_i f + n^2\lambda_i^2/4$ for focussing or imaging radiation of wavelength $\lambda_i$ at the focal length f, the diffractive geometries on the stack of minus filters producing a pattern of concentric rings of different color transmissivity.

* * * * *